(12) United States Patent
Anne et al.

(10) Patent No.: US 6,282,660 B1
(45) Date of Patent: Aug. 28, 2001

(54) EXTENDING DIAL UP NETWORKING PARADIGM TO COVER NETWORK CONNECTIONS

(75) Inventors: Ramakrishna Anne, Spring; Robert F. Watts, Houston, both of TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/164,543

(22) Filed: Oct. 1, 1998

(51) Int. Cl.[7] ................................................ G06F 1/26
(52) U.S. Cl. ..................... 713/300; 713/320; 713/322; 713/323
(58) Field of Search ..................... 713/300, 310, 713/320, 322, 323, 324, 330

(56) References Cited

U.S. PATENT DOCUMENTS

| | | | |
|---|---|---|---|
| 5,410,706 | * | 4/1995 | Farrand et al. . |
| 5,652,893 | * | 7/1997 | Ben-Meir et al. ................. 713/310 |
| 5,794,057 | * | 8/1998 | Lada, Jr. .......................... 713/300 |
| 5,925,134 | * | 7/1999 | Solomon . |
| 6,000,043 | * | 12/1999 | Abramson ......................... 714/44 |

OTHER PUBLICATIONS

*Packet Services —LANs and WANs*, Copyright 1996 © Cisco Systems, Inc., http://cio.cisco.com/warp/public/537/4.html, Sep. 17, 1998, 33 pages.
*Break the Bandwidth Barrier*, BYTE Magazine —Sep. 1996/Cover Story, http://www.byte.com/art/9609/sec6/art1.htm, Sep. 14, 1998, 18 pages.
*xDSL Supercharges Copper*, by Robyn Aber, 3Com Corp., Mar. 1997, http://www.data.com/tutorials/xdsl.html, 7 pages.

* cited by examiner

*Primary Examiner*—Ario Etienne
(74) *Attorney, Agent, or Firm*—Akin, Gump, Strauss, Hauer & Feld, LLP (57) ABSTRACT

A computer's representation and handling of dial-up and network applications are standardized. A LAN connection is established on a session basis only when required, enabling a user or system administrator to have the same control over the LAN connection as is typically exercised over a WAN connection. Examples of WAN connection features that are available to the LAN connection are the maintenance of billing information, access control, authentication and verification. In addition, an application can be represented by several different icons configured to utilize different procedures and communication devices.

39 Claims, 9 Drawing Sheets

EXTENDING DIAL UP NETWORKING PARADIGM TO COVER NETWORK CONNECTIONS

BACKGROUND OF THE INVENTION

1. Field of the Invention

The present invention relates generally to a method of handling a computer's network connections and, more particularly, to a method that enables a computer user or system administrator to standardize user interfaces for network and dial-up applications and to enable, disable, and monitor network based applications.

2. Description of the Related Art

In the beginning of the digital age, computers were stand-alone devices. Typically every computer had its own programs, data and peripheral devices such as printers and modems. With the advent of personal computers (PCs), it became advantageous to share programs, data and peripheral devices among computers. For example, a laser printer that is only used occasionally by an individual PC might cost more than the PC. If the printer can be shared, the expense of providing print services to a number of computers located in close proximity to each other can be reduced.

A number of methods for connecting computers and sharing resources among them were developed. Modems were developed to enable users to log in to or transfer data between distant machines, often over a telephone line. More recently, communication devices such as asynchronous digital subscriber line (ADSL) and cable modems have been developed. Computers that were close together were organized into local area networks (LANs) and those that were farther apart into wide area networks (WANs). Although a WAN can consist entirely of a collection of widely dispersed stand-alone computers, a WAN is more often comprised of two or more LANs connected by means of public telephone or leased lines. The Internet is an example of a WAN.

Other innovations that followed the advent of the PC were "windowing" systems and "desktops." Xerox Star, developed at the Xerox Corporation's Palo Alto Research Center (PARC) in Palo Alto, Calif., demonstrated the practicality of a graphical user interface (GUI). Soon thereafter other GUIs were developed, including mac by the Apple Computer Corporation of Cupertino, Calif. and Windows by the Microsoft Corporation of Redmond, Wash.

In addition to a window system, a desktop system is typically included on today's PCs. One feature of the desktop is that a program or application can be initiated by clicking on an icon with a mouse. Depending upon where the application is located, on the current computer, on a connected LAN or on a connected WAN, the GUI follows a specified procedure to initiate the application. Since LAN connections are established when the computer is booted up, there is usually very little difference between initiating an application located on the current computer and one located on a connected LAN. However when an application is located on a connected WAN or other remote computer, the GUI typically must first, before executing the program, establish a connection to the remote computer.

Typically a LAN connection from one computer to another is enabled when the computer is powered up and remains enabled as long as the computer remains up. This provides nearly transparent access to programs, data and peripheral devices among computers on the LAN because, unlike resources located on a WAN, connections do not have to be established every time an application is initiated. In the normal scheme of things this is perceived as an advantage.

SUMMARY OF THE INVENTION

In a system implemented according to the invention, both a computer's representation and handling of dial-up and network applications are standardized. Traditionally a computer's network connections have been classified as either Local Area Network (LAN) or Wide Area Network (WAN) connections. Typically, LAN connections are established when the computer is turned on or re-booted and are available continually until the computer is turned off. On the other hand, WAN connections are established on a session-by-session basis, or when an application that requires the connection is instantiated. Although the trend in the computer industry has been to make the WAN connection scenario conform to the LAN connection scenario, there are clear advantages to proceeding in the opposite direction.

Unlike a WAN connection that is established on a session basis only when required, a LAN connection is typically always on. This prevents a user or system administrator for having the same control over the LAN connection as over a WAN connection. Examples of features of a WAN connection that are unavailable to a LAN connection are the maintenance of billing information, access control, authentication and verification.

In addition to providing the means of defining multiple WAN connections on, the method of the present invention enables a user or system administrator to configure both LAN and WAN connections with the same tool. The method of the present invention also enables a user to specify multiple connections for a single application, each connection with its own characteristics. For example, a database application may provide a connection that requires that a password for a typical user and provide a connection without password protection for the use of a database administrator. The database administrator's connection to the application may also be routed over a different route such as a faster, more secure, and more expensive line.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Figure 1:
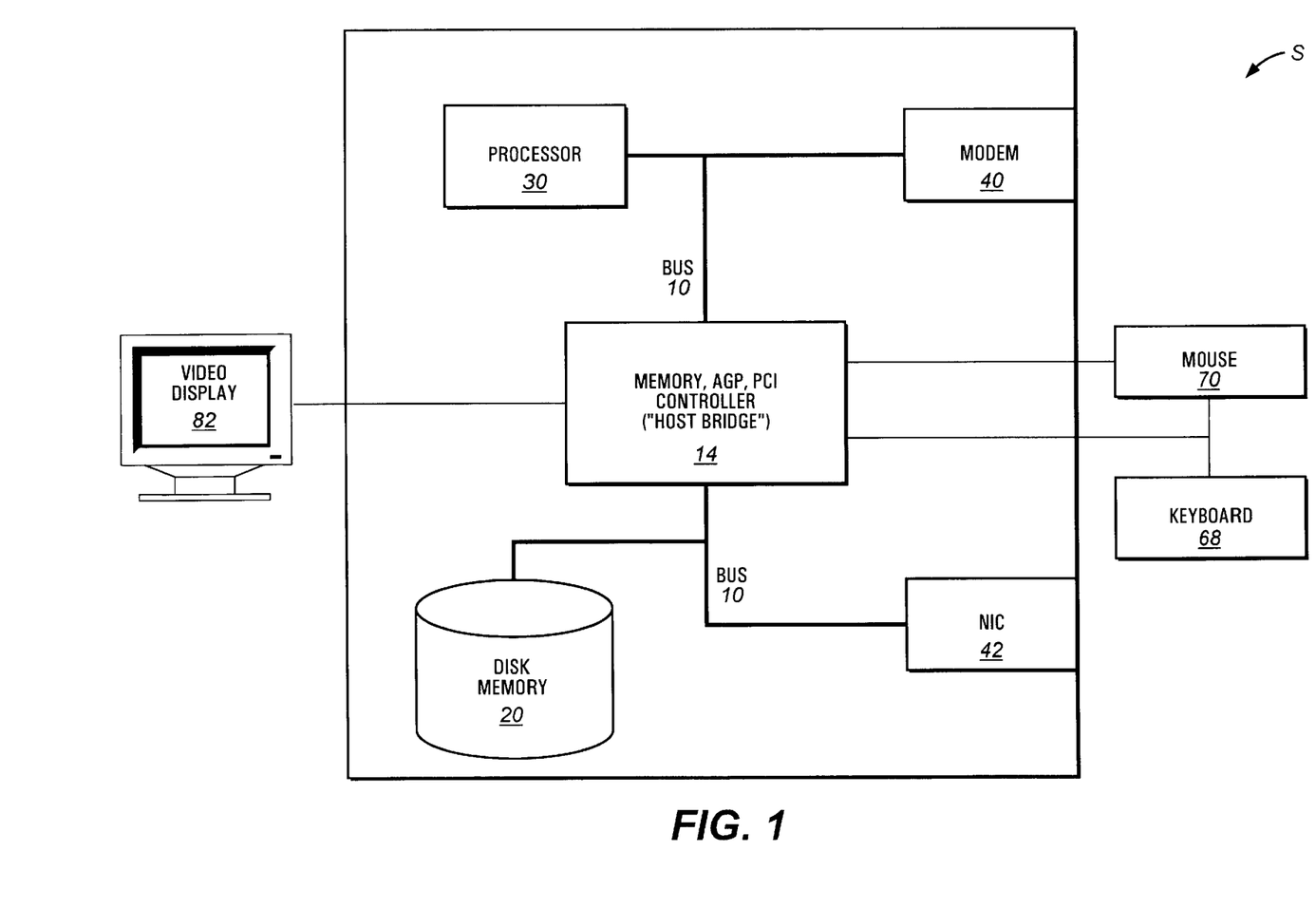
FIG. 1 is a block diagram of a computer system according to the invention showing peripheral devices and data/address buses.

Turning to FIG. 1, illustrated is a typical computer system S implemented according to the present invention. The computer system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 30 and a disk memory subsystem 20.

The host bridge 14 in the disclosed embodiment is a 440LX Integrated Circuit by Intel Corporation, also known as the PCI AGP Controller (PAC). The processor 30 is preferably a Pentium Pro, manufactured by the Intel Corporation of Santa Clara, Calif. The processor 30 could be replaced with a different processor, other than the Pentium Pro, without detracting from the spirit of the invention.

The PCI bus 10 couples a variety of devices that generally take advantage of a high-speed data path. This includes a network interface controller (NIC) 42, which preferably supports the ThunderLan™ power management specification by Texas Instruments, and an internal modem 40. In another embodiment of the invention, the NIC 42 might be in addition to or replaced by an ADSL or cable modem. Finally, a video display 82, a mouse 70, and a keyboard 68 are also coupled to the host bridge 14, enabling human interaction with the computer system S.

The computer system S illustrates only one platform in which the system according to the present invention can be implemented. The disclosed techniques can, without distracting from the spirit of the invention, be implemented in many systems that contains a window system and connection to a network, either a LAN or a WAN, regardless of whether the device contains less, additional, or different components than the system in FIG. 1.

Figure 2:
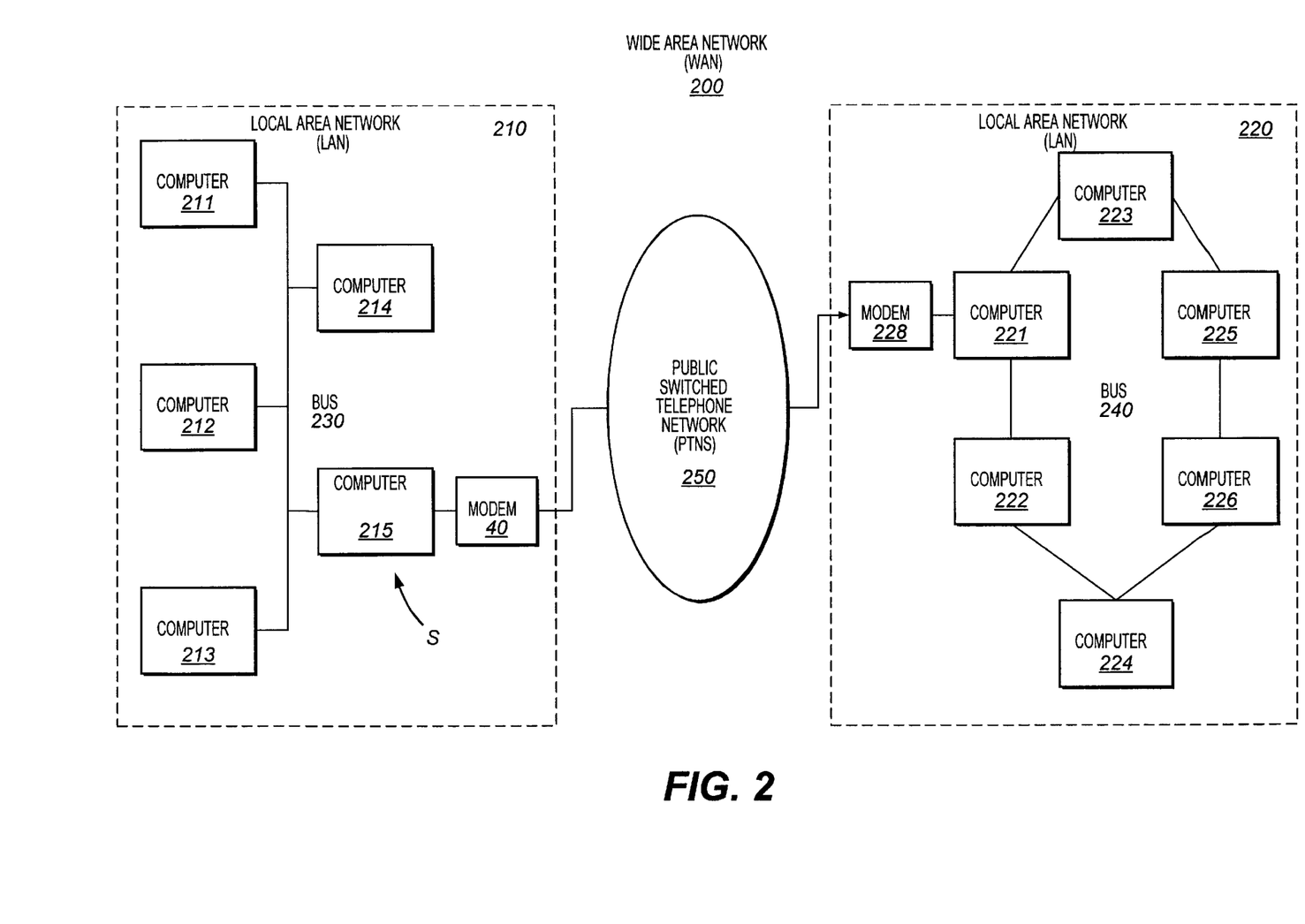
FIG. 2 is a diagram of two local area networks connected into a wide area network.

Turning now to FIG. 2, illustrated is the computer system S incorporated into a local area network (LAN) 210. Computer system S is represented by computer 215, showing the internal modem 40 separately. The LAN 210 is configured around a Ethernet bus 230. The Ethernet bus 230 connects a number of other computers 211–214 into the LAN 210. The computers 211–214, like computer system S, contain a processor 40, memory controller 14, a bus 10, a NIC 42, disk memory 20, and possibly a modem 40, mouse 70, keyboard 68, and video display 82. For simplicity, these components of the computers 211–214 are not shown. The exact elements of the computers 211–214 is not important for purposes of the present invention as long as they process data and are networked together.

Also illustrated is a LAN 220 connected together by a Token Ring bus 240. The LAN 220 contains a number of computers 221–226. Connected to the computer 221 is a dialup modem 228.

The two LANs 210 and 220 are configured into a wide area network (WAN) 200 through the public switch telephone network (PTSN) 250 by means of the modems 40 and 228. It is not necessary for the LANs 210 and 220 to utilize the PSTN 250 for the connection; there are a number of equally suitable mediums for connecting computers into a WAN such as leased telephone lines, private lines, or satellite communication links. In addition, there are a number of alternatives for the telephone modems 20 and 228 such as Digital Subscriber Line (DSL) or Cable modems.

Figure 3A:
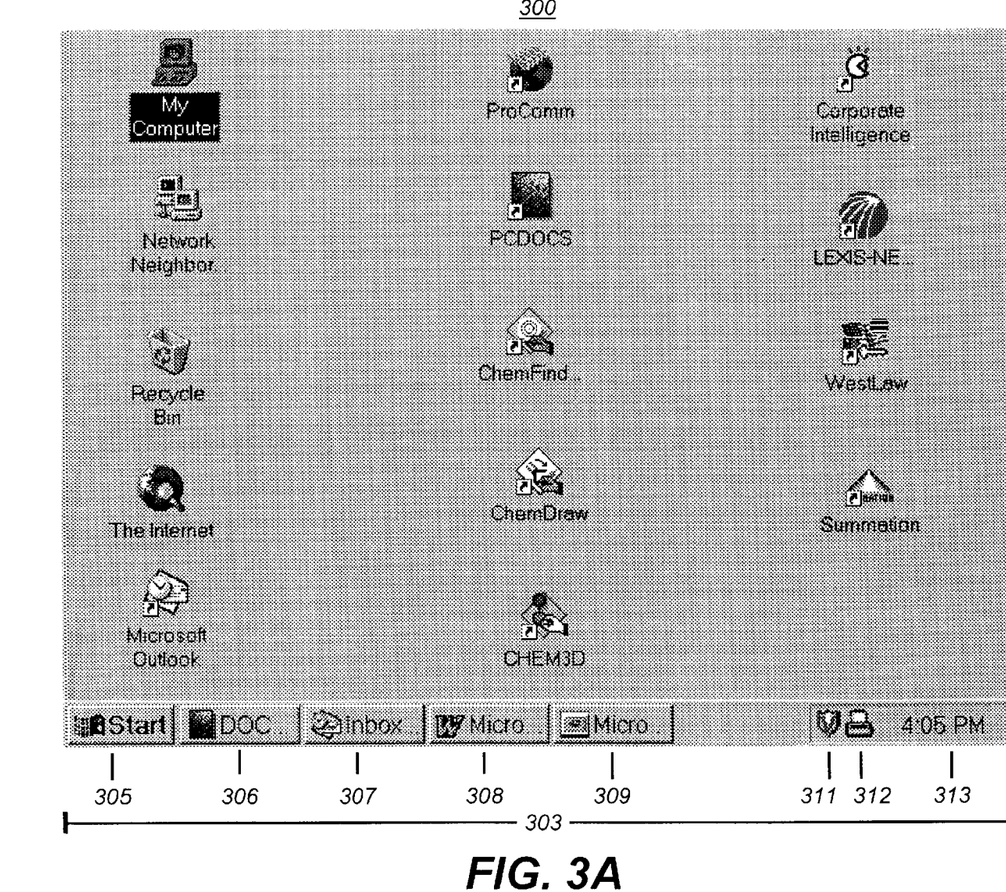
FIG. 3A is diagram of a typical computer desktop display screen.

Turning now to FIG. 3A, illustrated is a typical computer desktop display image 300. The desktop display image 300 illustrated is generated by a computer system S on the video display 82 by a Windows OS manufactured by the Microsoft Corporation.

Within the main window of the desktop are three columns of icons, each of which represents a program, or application.

In the first column, three icons labeled "My Computer," "Network Neighbor" and "Recycle Bin." are generated by the Windows OS and represent programs that are stored and run on the computer system S. Icons in the first column, labeled "The Internet" and an "Microsoft Outlook," represent stand-alone programs published by the Microsoft Corporation. Typically, an application is initiated when a user, using the mouse 70, moves a pointer, or cursor, (not shown) onto the application's icon and double clicks a button on the mouse 70.

The first icon in the second column of the desktop display image 300, labeled "ProComm," represents an application, published by Datastorm Technologies, Inc. of Columbia, Mo., that is typically a local application or, in other words, is stored on the hard drive 20 of the computer system S. The second icon in the second column, labeled "PCDOCS," represents an application published by the Inso Corporation of Chicago, Ill. Unlike ProComm, PCDOCS is a network based application that is typically stored on a disk drive located on a different computer on the LAN 210, such as computer 211, called a network file server.

A network file server 211 is a computer on the LAN 210 that stores files, either data or applications, for the other computers 212–215. When an application is initiated on the computer 215, the program itself is copied from the network file server 211 across the LAN 210 to the computer 215 where it is executed by the processor 30 in computer 215. In another embodiment, the computer 211 is an application server. When a program stored on an application server 211 is initiated on the computer 215, the program actually runs on the processor 30 in the application server 211. Requests are sent from computer 215 across the LAN 210 to the application server 211 and responses are returned from the application server 211 across the LAN 210 to the computer 215 to be displayed on the video display 82.

The bottom three icons in the second column of the desktop display image 300, labeled "ChemFind . . . " ("ChenFinder"), "ChemDraw" and "Chem3D." represent software programs published by the CambridgeSoft Corporation of Cambridge, Mass. Like PCDOCS, these programs are typically stored on either a network file server or an application server. A LAN 210 may have multiple file and application servers.

In addition to local and network applications, there are also remote applications. A remote application typically is an application that connects to a second application on a computer that is not connected to the same LAN as the first application. For example, an application running on the computer 215 is a remote application if it connects to an application running on computer 222 connected to LAN 220. Often the remote application running on computer 215 sends only keystrokes from the keyboard 68 to the computer 222. Computer 222 processes the keystrokes and returns screen displays for display on the video display 82 connected to computer 215.

The first three icons in the third column of the desktop display image 300, labeled "Corporate Intelligence," LEXIS-NE . . . ," ("LEXIS-NEXIS") and "Westlaw" are examples of remote applications. Corporate Intelligence is published by the Corporate Intelligence Corporation of Browns Point, Wash. LEXIS-NEXIS is published by the Reed Elsevier Corporation of Charlottesville, Va. Westlaw is published by the West Group of St. Paul, Minn. The fourth icon in the third column of the desktop display image 300, labeled "Summation." represents a network application published by Summation Legal Technologies, Inc. of San Francisco, Calif.

A window system and the desktop display image 300 hide many details of running an application from the user, however, the OS must treat each type, local, network and remote, differently. The method of the present invention allows the OS to treat each application type in a similar fashion, allowing the user to take advantage of common remote application features such as maintenance of billing and connection time information and access control, authentication and verification.

Finally, a menu bar 303 stretches across the bottom of the desltop display image 300. A "Start" button 305 provides a user to access to additional programs that are not represented by icons in the main display area of the desktop display image 300. Buttons 306–310 represent applications that are currently running on the computer system S. The button 306, labeled "DO . . . ," indicates that the PCDOCS application is running and, the button 307, labeled "Inb . . . ," indicates that the Microsoft Outlook application is running. The two buttons 308 and 309, both labeled "Mic . . . ," indicate that the Microsoft Word and the Microsoft Powerpoint applications respectively, both published by the Microsoft Corporation, are running.

A symbol 310 indicates that an application titled VShield published by the McAfee Corporation of Santa Clara, Calif. is running. A symbol 312 indicates that an application FightFAX published by RightFAX, Inc. of Tucson Ariz. is running. A display 313 indicates the time of day.

Figure 3B:
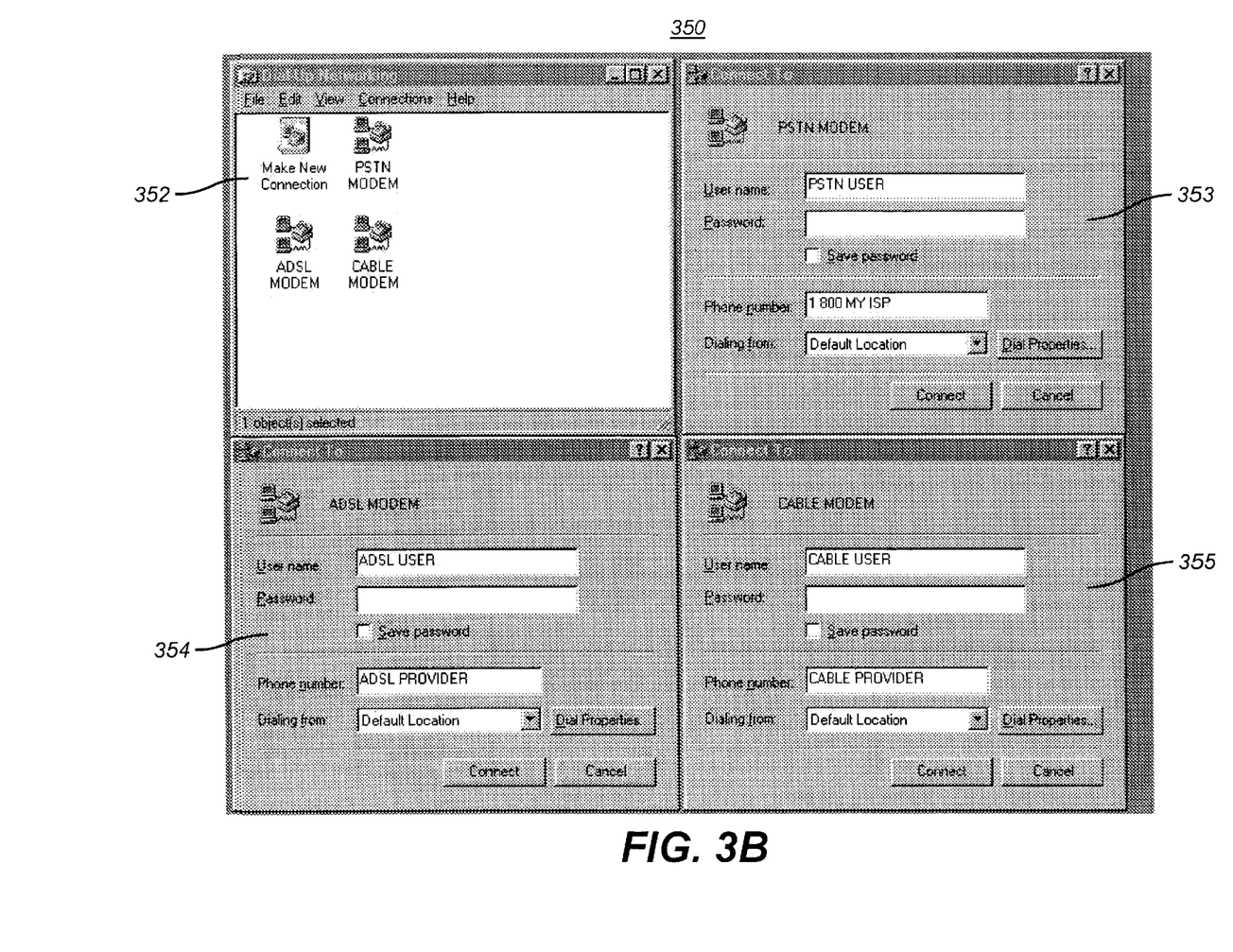
FIG. 3B is a diagram of a dialup networking (DUN) configuration program that may be used to configure a WAN connection.

Turning now to FIG. 3B, illustrated is a desktop display image 350 containing four windows 352–355. The upper left window 352 is an example of a DUN configuration GUI that enables a user to create and define network and remote connections. The windows 353–355 represent defined connections: the upper right window 353 representing a PSTN connection, the lower left window 354 representing an ADSL modem connection, and the lower right window 355 representing a cable modem connection.

The upper right window 353 is displayed when a user points a cursor to the icon labeled "PSTN MODEM" in the upper left window 352 and double clicks with the mouse 70. A text entry field labeled "User name" contains a name that the user has decided to call this connection, in this case "PSTN USER." A text entry field labeled "Phone number" indicates that this connection should dial out on a modem 40 using the telephone number "1 800 MY ISP."

The lower left window 354 is displayed when the user points the cursor to the icon labeled "ADSL MODEM" in the upper left window 352 and double clicks with the mouse 70. A text entry box labeled "Phone number" indicates that this connection is routed through an ADSL modem which might be connected to or replaced by a NIC 42. In another window representing another connection this field might contain an internet protocol (IP) address indicating that the connection is routed through a LAN, either to another computer on the LAN or possibly to a remote computer on the Internet. Depending upon which icon has been clicked by the user, the IP connection may be setup using a WAN device such as the modem 40 or using a LAN device such as the NIC 42.

The lower right window 355 is displayed when the user points the cursor to the icon labeled "CABLE MODEM" in the upper left window 352 and double clicks with the mouse 70. If the user drags the cursor to the icon labeled "Make New Connection" and double clicks on the mouse 70, a new window identical to windows 353–355 but without the text in the data entry boxes would be displayed on the desktop 350. The new window would allow the user to define a new connection by entering appropriate data into the data entry areas.

Figure 4:
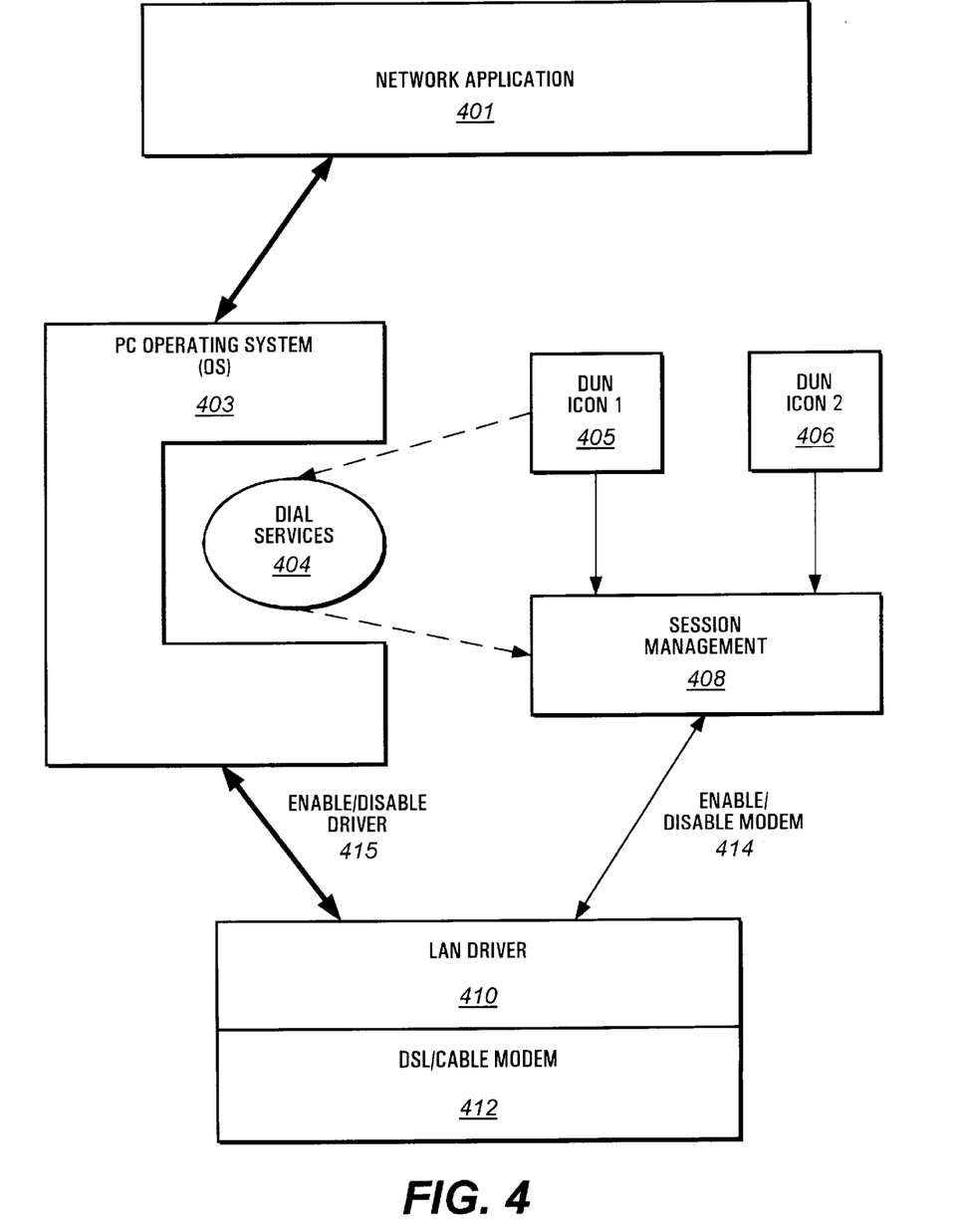
FIG. 4 is a block diagram showing a typical dialup network (DUN) paradigm.

Turning now to FIG. 4, illustrated is a block diagram of data and control flow for Dialup and network applications. A PC OS 403 which runs on the processor 30 of the computer system S contains Dialup Services 404. A network application 401 makes requests to and transfers data with the OS 403. The requests and data are typically forwarded through the LAN driver 410.

Icons that represent dialup applications 405 and 406 typically route control information through the dialup service 404 of the OS 403 which enables session management 408 to setup direct data transfer between the applications 405 and 406 and the session management 408. Data and requests between the dialup application 405 and 406 and a DSL or cable modem 412 are routed through the session management 408. Session management 408 typically sends signals 414 to enable or disable the DSL/cable modem 412.

Decisions by the session management 408 to enable or disable 414 the modem 412 typically depend upon the current state of the modem 412 and the dialup applications 405 and 406. For instance, the session management 408 might disable as indicated at 414 the DSL/cable modem 412 for power management reasons if the dialup applications 405 and 406 have been inactive for too long a period of time.

Other services that the session management 408 often provides are billing services, connect time totals, authentication and user verification. Currently, OSs do not provide the same level of service to the network application 401. The method of the present invention enables the OS 403 to enable and disable as indicated at 415 LAN drivers 410 so that the same types of connection oriented services such as billing, connect time totals, authentication, and user verification are provided to network applications 401.

Figure 5:
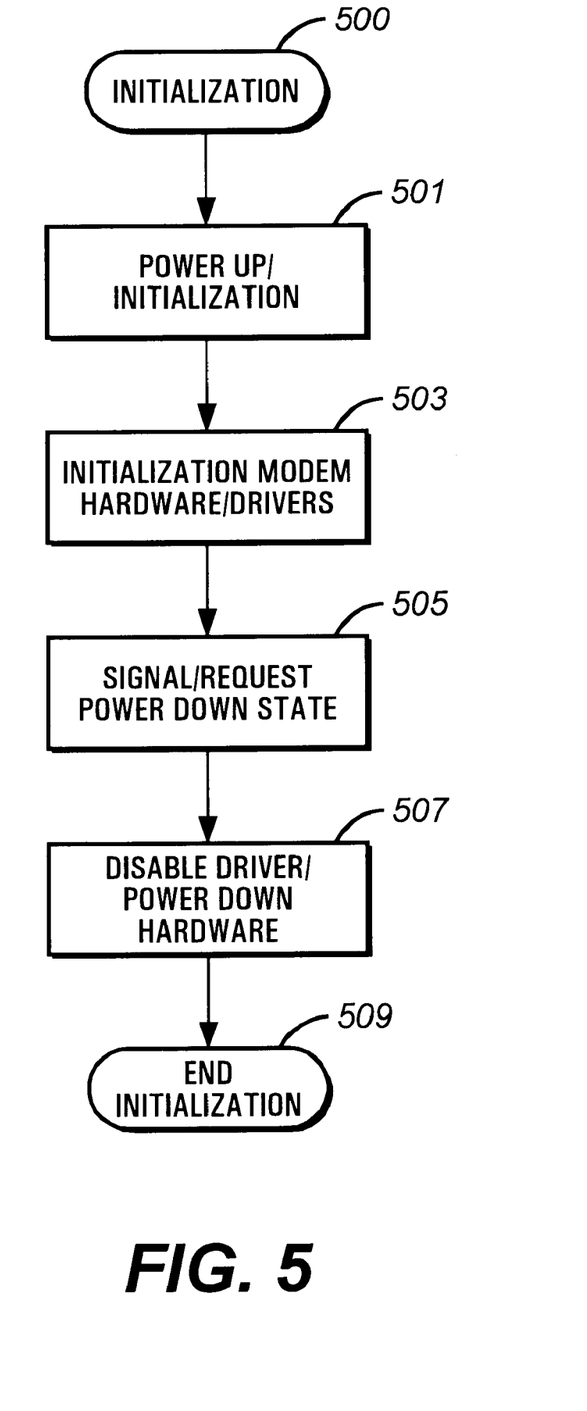
FIG. 5 is a flow chart showing the initialization routine of the present invention.

Turning now to FIG. 5, illustrated is a flow chart for the initialization portion of the method of the present invention. Initialization 500 begins at step 501 with a power up of the computer system S and immediately proceeds to step 503 where the DSL/cable modem 412, the LAN driver 410 or both are initialized. Next, at step 505, the OS sends a signal to request a power down state. The DSL/cable modem 412 and the LAN driver are placed in a inactive, or power down, state at step 507 and the initialization procedure is completed at step 509.

Figure 6:
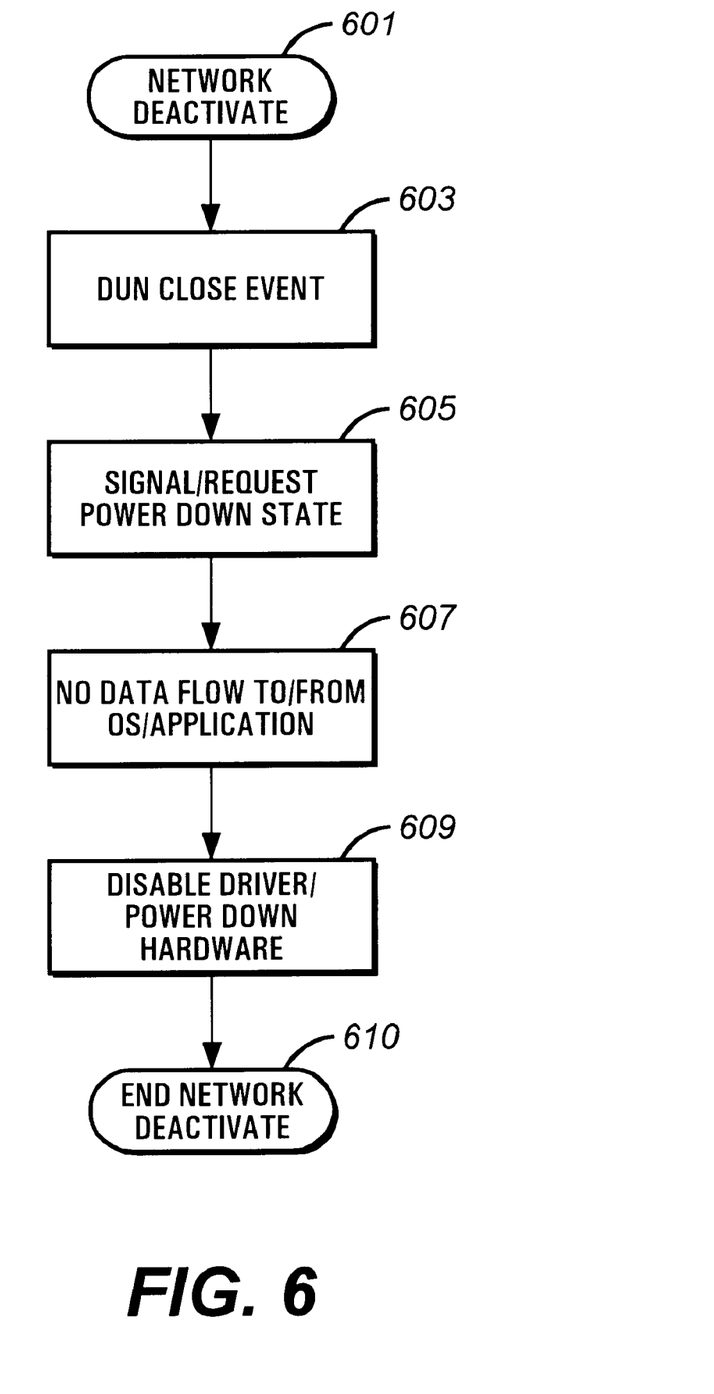
FIG. 6 is a flow chart showing the network deactivation routine of the present invention.

Turning now to FIG. 6, illustrated is a flow chart of the network deactivation portion of the method of the present invention. The network deactivation starts at step 601 upon receipt of a close event at step 603. This event can come as the result of a user choosing to close an icon such as the network icons in FIG. 3A or as the result of a timeout value being reached by the OS 403. In one embodiment, the network close event is similar to the dialup enable/disable modem event 414.

Upon receipt of the close event at step 603, the OS 403 sends a signal, or request, for a power down at step 605. In step 607, all data flow to and from the application is shut off. In one embodiment, the request or signal generated in step 605 is handled by a device driver in step 609. In another embodiment, it might be handled instead of or in addition by the NIC 42. Following the power down of the driver and/or NIC in step 609, the method completes in step 610.

Figure 7:
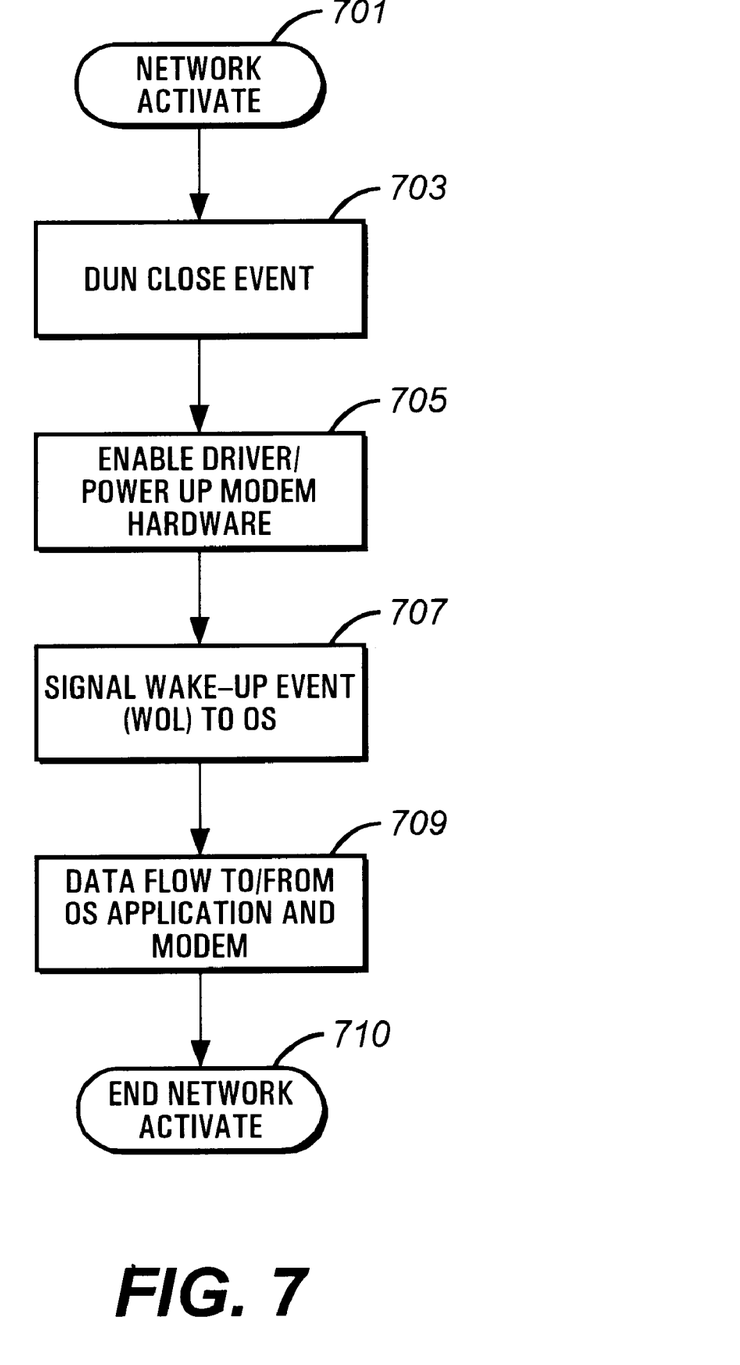
FIG. 7 is a flow chart showing the network activation routine of the present invention.

Turning now to FIG. 7, illustrated is a flow chart showing the activation portion of the method of the present invention. The network activation begins in step 701. As mentioned above, the method of the present invention may involve the device drivers, the NIC 42, or both. The activation begun in step 701 involves the components of computer system S that were initialized by means of the steps in FIG. 5 and deactivated using the steps in FIG. 6.

In step 703, the OS 403 receives a connection activate event. This event is typically the result of a user using the mouse 70 to double click on an icon on the desktop display image 300 of the computer system S. The network activate event might also be generated by the OS 403 as the result of the expiration of a timer of the arrival of a specific time or a external network event. Regardless of the reason, the OS 403 enables or power ups the LAN driver 410 or DSL/cable modem 412.

Upon completion of step 705, the OS 403 is notified in step 707 and, as a result, data is allowed to flow between the application and the LAN driver 410 or the DSL/cable modem 412. The process is completed in the end activate step 710.

Figure 8:
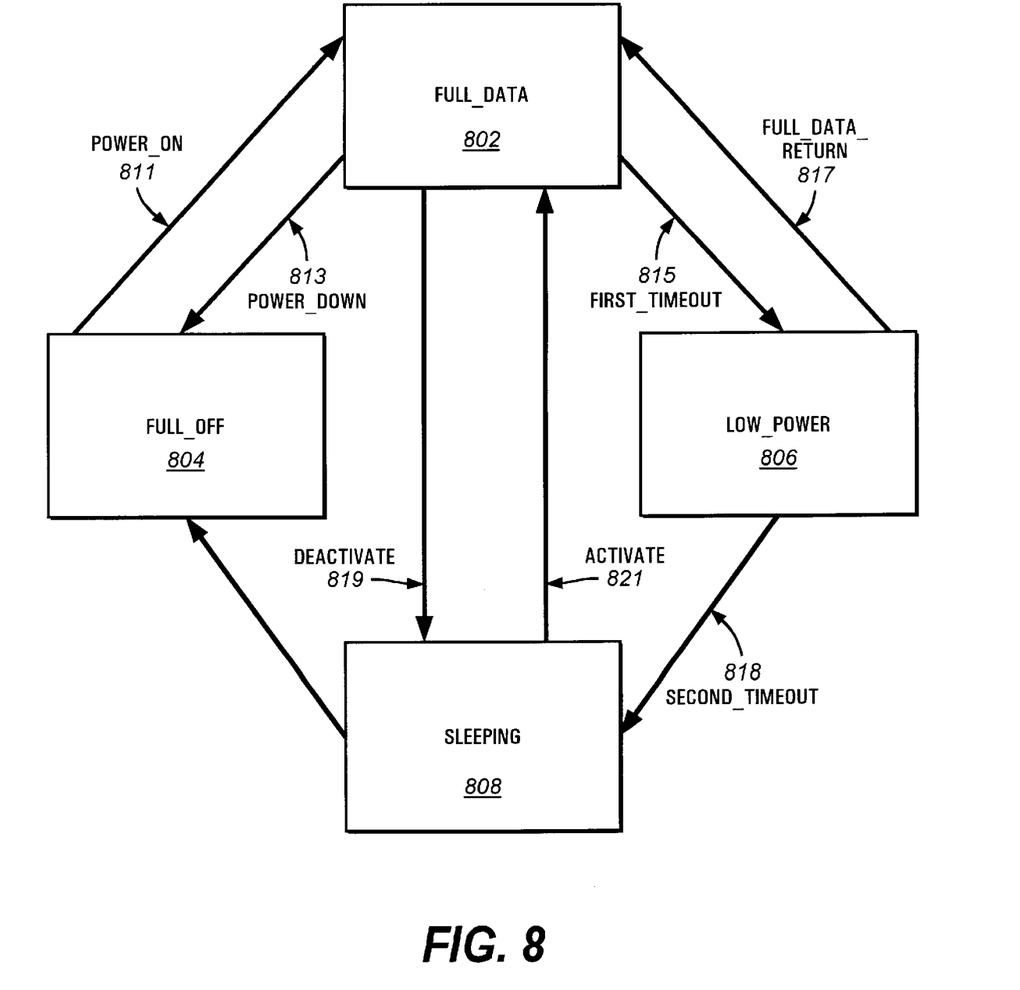
FIG. 8 is a diagram showing typical power state transitions for computer components.

Turning now to FIG. 8, illustrated is a state diagram showing possible power levels of the LAN driver 410 and/or DSL/cable modem 412. This diagram is illustrative of a deactivated state that may be initiated by the method of the present invention. Beginning from a power off condition, the first state is a FULL_OFF state 804. Upon a POWER_ON transition 811, the LAN driver 410 or modem 412 enters a FULL_DATA state 802. A FULL_DATA state corresponds to a typically operational environment for the modem 412.

A DEACTIVATE transition 819 corresponds to the deactivate flow chart illustrated in FIG. 6. The DEACTIVATE transition 819 takes the LAN driver 410 or modem 412 from the FULL_DATA state 802 to a SLEEPING state 808. The SLEEPING state 808 corresponds to a typical inactive period for the LAN driver 410 or modem 412, either as the result of a application time-out or user action such as the closing of an application.

Upon receipt of an ACTIVATE signal 821, illustrated in FIG. 7, the LAN driver 410 or modem 412 transitions from the SLEEPING state 808 to the FULL_DATA state 802.

In another embodiment, a LOW_POWER state 806 similar to a hot standby might also be implemented. The LOW_POWER state 806 can be a half way state between the FULL_DATA state 802 the SLEEPING state 808. For instance, the processor 30 might have two timeout values, the first of which activates a FIRST_TIMEOUT transition 815 that lowers the power consumption of the LAN driver 410 or modem 412, as in a SLEEPING state 808, while maintaining a connection, as in the FULL_DATA state 802, even though no data is flowing. The LOW_POWER state 806 can conserve power and allow a quicker return to a FULL_DATA state 802 by means of a FULL_DATA_RETURN transition 817. A SECOND_TIMEOUT transition 818 takes the LAN driver 410 or modem 412 from the LOW_POWER state 806 into the SLEEPING state 808. Once in a SLEEPING state 808, the ACTIVATE transition 821 would be required to return to the FULL_POWER state 802.

Finally, a POWER_DOWN transition 813 returns the LAN driver 410 or modem 412 from the FULL_DATA state 802 back to the FULL_OFF state 804.

The foregoing disclosure and description of the invention are illustrative and explanatory thereof, and various changes in the details of the illustrated apparatus and construction and method of operation may be made without departing from the spirit of the invention.

What is claimed is:

1. A method for initiating applications on a computer, the method comprising the steps of:
   displaying an application as an icon on a computer desktop display image;
   initializing a computer component during a computer power up or reboot;
   sending a signal from a processor to the computer component to enter a non-powered up state;
   transitioning the computer component into a non-full power state in response to the signal;
   sending a second signal from the processor to the computer component when the application is initiated; and
   transitioning the computer component into a full power state in response to the second signal.

2. The method of claim 1, further comprising the steps of:
   sending a third signal from the processor upon an indication that the application is terminating; and
   transitioning the computer component to the non-full power state in response to the third signal.

3. The method of claim 1, wherein the computer component is a network interface card.

4. The method of claim 2, wherein the network interface card is an Ethernet network interface card.

5. The method of claim 2, wherein the network interface card is a Token Ring network interface card.

6. The method of claim 1, wherein the computer component is a device driver.

7. The method of claim 1, wherein the non-full power state is a power off state.

8. The method of claim 1, wherein the full non-power state is a low power state.

9. The method of claim 1, further comprising the step of collecting data about the application.

10. The method of claim 9, wherein the collected data comprises the amount of time the application is in the full powered state.

11. The method of claim 9, wherein the collected data comprises billing information.

12. The method of claim 1, further comprising the step of providing access control to the application.

13. The method of claim 1, further comprising the step of providing authentication and/or verification of application data.

14. A computer system comprising:
   an application represented as an icon on a desktop display image;
   a computer bus;
   a processor coupled to the bus, the processor generating a signal on the bus in response to a power on or a reboot condition and generating a second signal on the bus in response to the initiation of the application; and
   a computer component coupled to the bus responsive to the signal and the second signal from the processor, the computer component transitioning to a non-full power state in response to the signal and transitioning to a full power state in response to the second signal.

15. The computer system of claim 14, wherein the processor generates a third signal to the computer component when the application is terminating and the computer component transitions to a non-full power state in response to the third signal.

16. The computer system of claim 14, wherein the computer component is a network interface card.

17. The computer system of claim 16, wherein the network interface card is an Ethernet card.

18. The computer system of claim 16, wherein the network interface card is a Token Ring card.

19. The computer system of claim 14, wherein the computer component is a device driver.

20. The computer system of claim 14, wherein the non-full power state is a power off state.

21. The computer system of claim 14, wherein the non-full power state is a low power state.

22. The computer system of claim 14, wherein data concerning the application is collected.

23. The computer system of claim 22, wherein the collected data comprises the amount of time the computer component is in the full power state.

24. The computer system of claim 22, wherein the collected data is billing information.

25. The computer system of claim 14, wherein the computer system provided access control to the application.

26. The computer system of claim 14, wherein the computer system provides authentication and/or verification services to the application.

27. A device for initiating applications within a computer system, the device comprising:

a computer component having logic to enter a non-full power state in response to a signal indicating that the computer system is being powered on or rebooted and having logic to enter a full-power state in response to a second signal indicating that an application has been initiated.

28. The device of claim 27, the computer component further comprising logic to enter a non-full power state in response to a third signal indicating that the application has been terminated.

29. The device of claim 27, wherein the computer component is a network interface card.

30. The device of claim 29, wherein the network interface card is an Ethernet card.

31. The device of claim 29, wherein the network interface card is a Token Ring card.

32. The device of claim 27, wherein the computer component is a device driver.

33. The device of claim 27, wherein the non-full power state is a power off state.

34. The device of claim 27, wherein the non-full power state is a low power state.

35. The device of claim 27, further comprising logic to collect data about the application.

36. The device of claim 35, wherein the collected data comprises the amount of time the application is in the full power state.

37. The device of claim 35, wherein the collected data comprises billing information.

38. The device is claim 27, further comprising logic to provide access control to the application.

39. The device of claim 27, further comprising logic to provide authentication and/or verification for the application.

* * * * *